June 25, 1968  C. B. McGREW, JR  3,390,309
MOLDED COMBINATION AUTOMOTIVE GLOVE COMPARTMENT
AND ELECTRICAL FUSE PANEL
Filed March 13, 1967
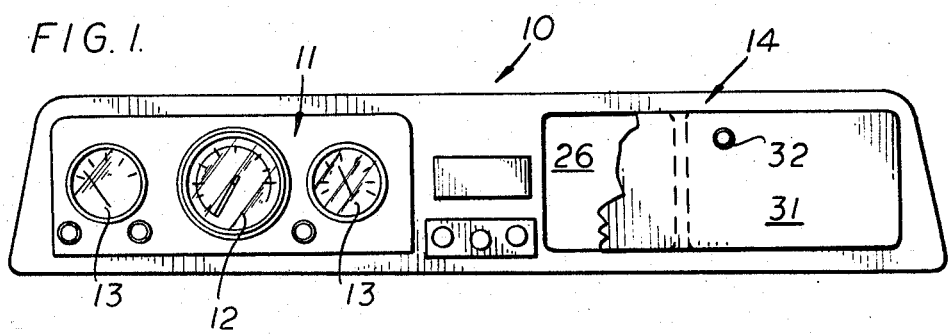
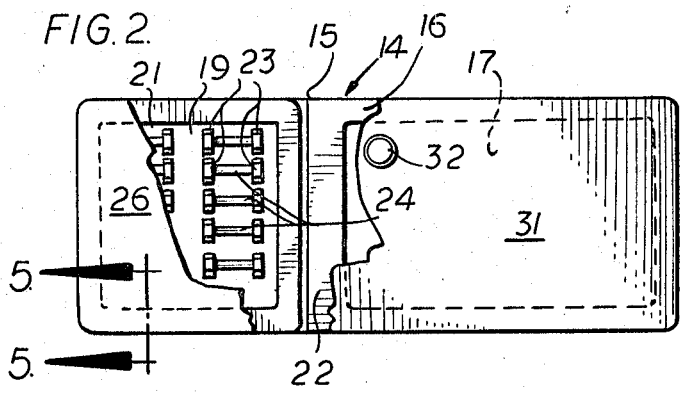
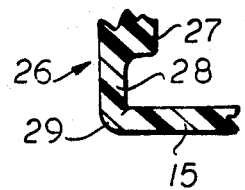
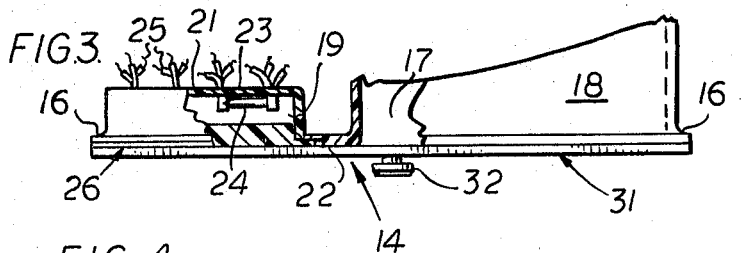
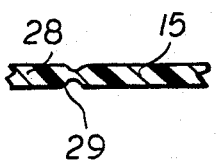
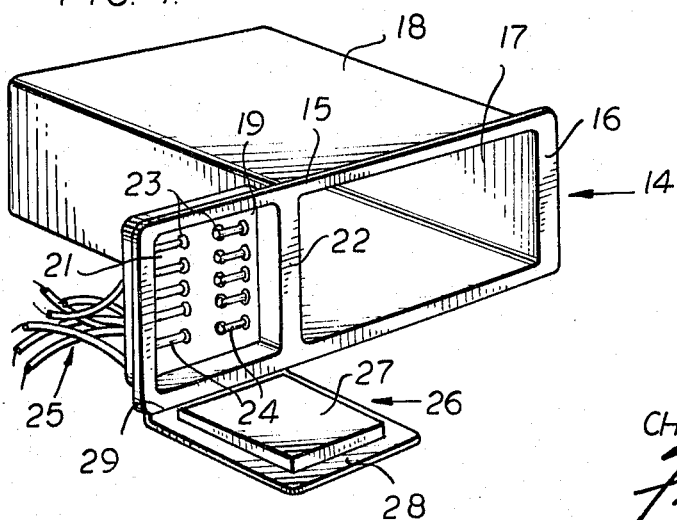
INVENTOR
CHARLES B. McGREW, JR.
ATTY

United States Patent Office 3,390,309
Patented June 25, 1968

3,390,309
MOLDED COMBINATION AUTOMOTIVE GLOVE COMPARTMENT AND ELECTRICAL FUSE PANEL
Charles B. McGrew, Jr., Fort Wayne, Ind., assignor to International Harvester Company, Chicago, Ill., a corporation of Delaware
Filed Mar. 13, 1967, Ser. No. 622,542
7 Claims. (Cl. 317—116)

ABSTRACT OF THE DISCLOSURE

A combination glove compartment and electrical fuse panel integrally molded and including a door or closure for the fuse panel of an automobile or truck dashboard panel and having the fuse clips and terminals embedded in the molded fuse panel. The fuse panel closure is formed with a flexible hinge of the same material as the glove compartment and fuse panel.

---

The present invention relates to a molded combination automotive glove compartment and electrical fuse panel for the dashboard of an automotive vehicle or truck with an integrally formed or molded door providing a closure for the fuse panel.

Current practices in the manufacture of motor truck products places the fuse panel for the vehicle's electrical system adjacent to a container on the dashboard commonly known as the glove compartment or box. The glove compartment proper is normally fabricated from a base material, such as paperboard, and the fuse panel is formed of a non-conductive pressed board material. The present invention simplifies the construction and installation of both the fuse panel and the glove compartment.

Among the objects of the present invention is the provision of a glove compartment and electrical fuse panel which are molded simultaneously and integrally from a non-conductive plastic material. This molded combination can be formed as a part or portion of a complete dashboard panel or the molded combination can be readily received and quickly installed in a conforming opening in the dashboard panel with a minimum of time, effort and tools.

Another object of the present invention is the provision of a molded combination glove compartment and adjacent electrical fuse panel where the fuse retaining clips and terminals therefor are molded into and embedded in the fuse panel to provide ease of access to the fuses and ease of installing and connecting any necessary wiring thereto.

A further object of the present invention is the provision of a molded combination glove compartment and electrical fuse panel in which the fuse panel has a closure or door normally covering the access opening to this panel and integrally molded and hinged to the fuse panel. The door of the glove compartment is normally a separate member hinged to the compartment, but could be integrally molded and hinged to the glove compartment with a flexible plastic hinge in the manner of the fuse panel.

Additional objects and advantages of my invention should be apparent to those skilled in the art from the following description when considered in connection with the accompanying drawing illustrating a preferred embodiment thereof.

In the drawing:

FIGURE 1 is a front elevational view of a dashboard for an automotive vehicle having the molded combination glove compartment and electrical fuse panel installed therein.

FIG. 2 is a front elevational view of the molded combination glove compartment and electrical fuse panel removed from the dashboard and with portions broken away.

FIG. 3 is a top plan view of the combination glove compartment and fuse panel of FIG. 2 with portions broken away.

FIG. 4 is a perspective view of the combination glove comportment and electrical fuse panel.

FIG. 5 is an enlarged vertical cross sectional view taken on the line 5—5 of FIG. 2 showing the integral hinge for the fuse panel closure.

FIG. 6 is a view similar to FIG. 5 but with the closure in open position.

Referring more particularly to the disclosure in the drawing, FIG. 1 discloses a dashboard 10 for a truck or other automotive vehicle having an instrument panel 11 with a conventional speedometer 12, gauges 13 and other control means and control knobs, and a novel combination glove compartment and electrical fuse panel unit 14 built or assembled into the dashboard 10. As more clearly seen in FIGS. 2, 3 and 4, the combination unit 14 includes a face panel 15 having an encompassing or peripheral flange 16; the panel having an access opening 17 for a rearwardly extending glove compartment or receptacle 18 and a recess 19 for an electrical fuse panel 21 separated from the glove compartment opening 17 by a vertical web 22 forming a partition.

The combination unit 14 is molded in one piece from a suitable resilient non-conductive plastic material, such as polypropylene, which plastic material has the advantages of an improved appearance, color and protection of the fuse panel. Fuse retaining clips and terminals 23 are molded into the fuse panel 21 to receive the necessary fuses 24 for operation of the electrical system of the vehicle, with the terminals receiving the wiring 25 for the vehicle electrical circuit (not shown).

Furthermore, a fuse panel closure or door 26 having a central rearwardly projecting or thicker portion 27 and a peripheral flange 27 is integrally molded to the lower edge of the face panel by an integral hinge 29 formed of the same material as the closure and fuse panel. FIG. 5 discloses the hinge 29 with the closure 26 in raised or closed position and FIG. 6 discloses this form of the hinge with the closure in open position, the hinge being of a reduced thickness of the plastic material for increased flexibility. When closed, the sides or edges of the rearwardly projecting or thicker portion 27 frictionally engage the interior walls or sides of the recess 19 to thereby retain the closure in closed position (see FIG. 3).

The glove compartment 18 is also provided with a door or closure 31 suitably hinged onto the face panel 15, which preferably extends transversely and also covers or overlies the door 26 when in its closed position, as illustrated in FIGURE 3. The closure 31 may be equipped with a suitable knob or pull 32 for facilitating opening thereof. It is intended that the door or closure 31 be equipped with a suitable latching or locking means to retain the door closed.

The embodiment of the invention chosen for the purposes of description and illustration herein is that preferred for achieving the objects of the invention and developing the utility thereof in the most desirable manner. It is to be uunderstood, however, that the particular functional and physical aspects emphasized herein are not intended to exclude but rather to suggest such other adaptations and modifications of the invention as fall within the spirit and scope of the invention as defined in the appended claims.

Having thus disclosed my invention, I claim:

1. A dashboard assembly for an automotive vehicle, comprising a face panel of molded non-conductive plastic having a peripheral flange defining an access opening and an adjacent recess therein, an integral glove compartment extending rearwardly from the opening in the face panel, and an electrical fuse panel mounted in the recess adjacent the glove compartment in the face panel, said glove compartment opening and said recess being divided by a partition in said face panel.

2. A dashboard assembly as set forth in claim 1, in which fuse retaining clips and terminals are embedded in said fuse panel, said terminals being exposed at the rear of the fuse panel for connection to circuit wiring for the vehicle.

3. A dashboard assembly as set forth in claim 1, in which said fuse panel is provided with a closure molded integrally with said face panel, and an integral flexible hinge joins the face panel and closure.

4. A dashboard assembly as set forth in claim 3, in which said hinge is formed of the same material as the face panel and its closure but of a lesser thickness.

5. A dashboard assembly as set forth in claim 3, in which said closure has a central rearwardly projecting portion and a peripheral flange, the central portion conformably received in and frictionally retained in the recess for the fuse panel.

6. A dashboard assembly as set forth in claim 1, including a door hingedly mounted on the face panel to close the glove compartment.

7. A dashboard assembly as set forth in claim 1, in which said electrical fuse panel is molded integrally with said face panel and recess and said glove compartment.

References Cited

UNITED STATES PATENTS 3,174,576   3/1965   Woofter et al.
3,341,745   9/1967   Munro _____ 317—116

ROBERT K. SCHAEFER, *Primary Examiner.*

M. GINSBURG, *Assistant Examiner.*